Feb. 7, 1961     H. T. KERYLUK ET AL     2,970,773
FLUID MIXING AND APPLYING APPARATUS AND METHOD
Filed Oct. 19, 1959     3 Sheets-Sheet 1
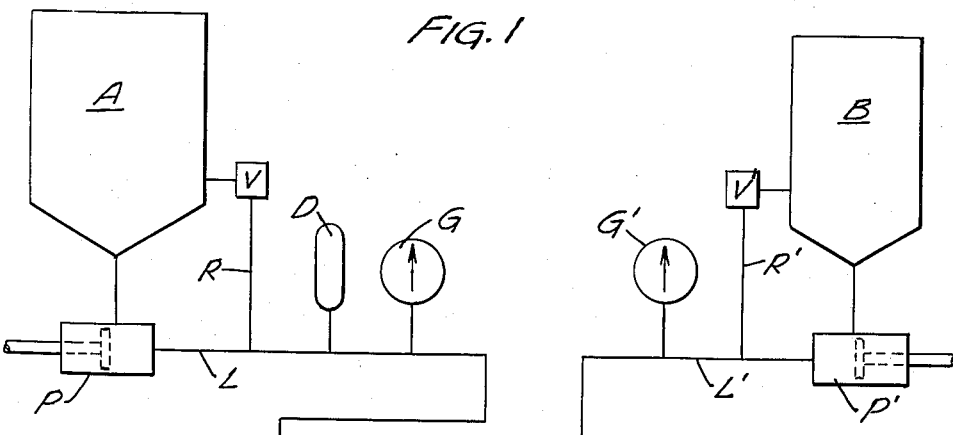
FIG. 1
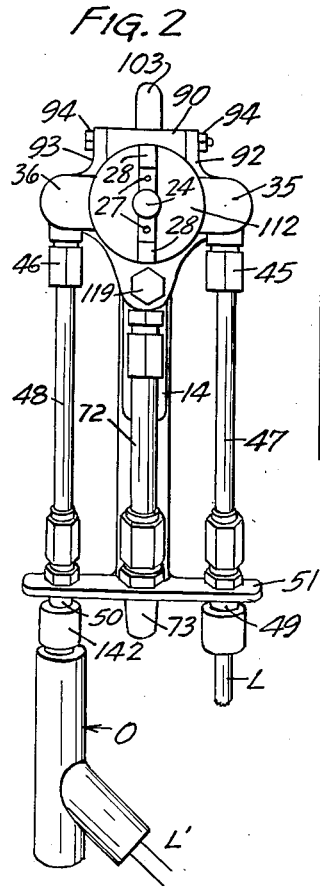
FIG. 2
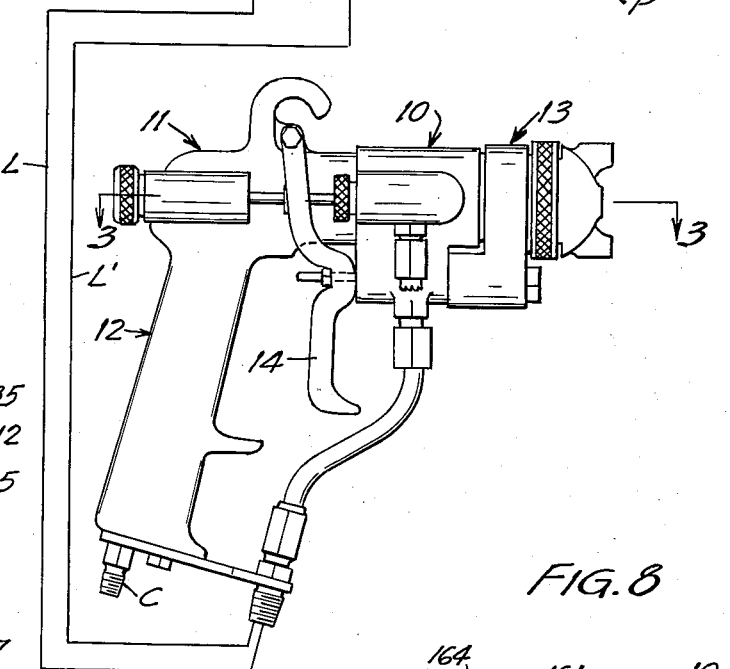
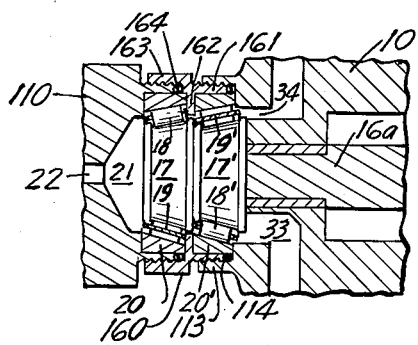
FIG. 8
INVENTORS
HORACE THEODORE KERYLUK
TADIE KYRYLUK
BY Carpenter, Abbott, Coulter, & Kinney
ATTORNEYS

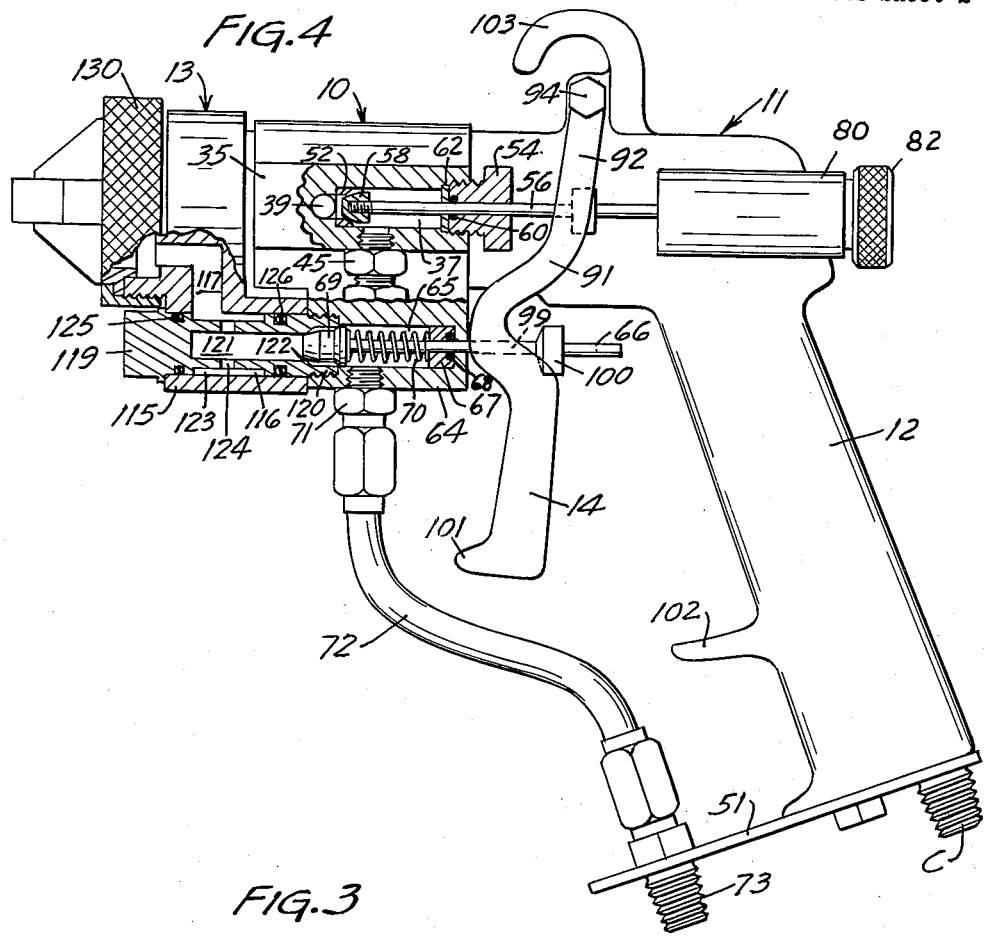
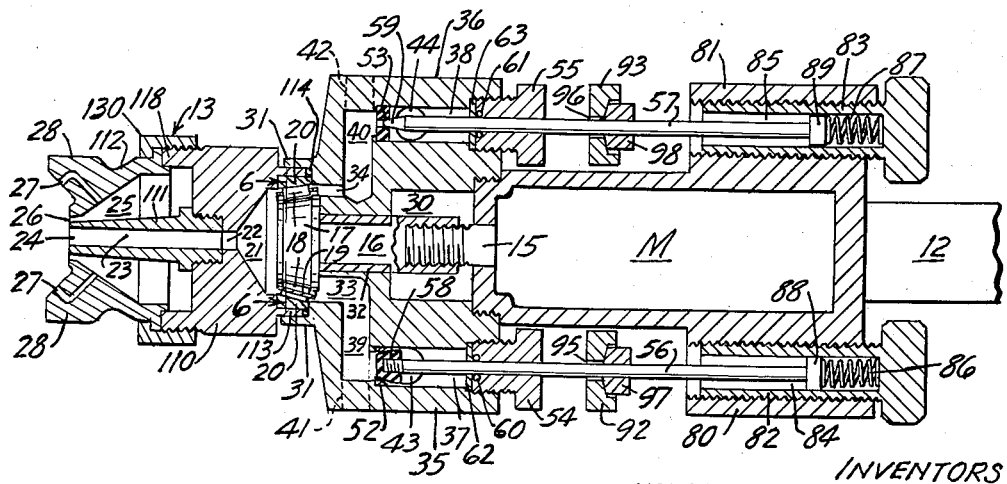

Feb. 7, 1961    H. T. KERYLUK ET AL    2,970,773
FLUID MIXING AND APPLYING APPARATUS AND METHOD
Filed Oct. 19, 1959    3 Sheets-Sheet 3
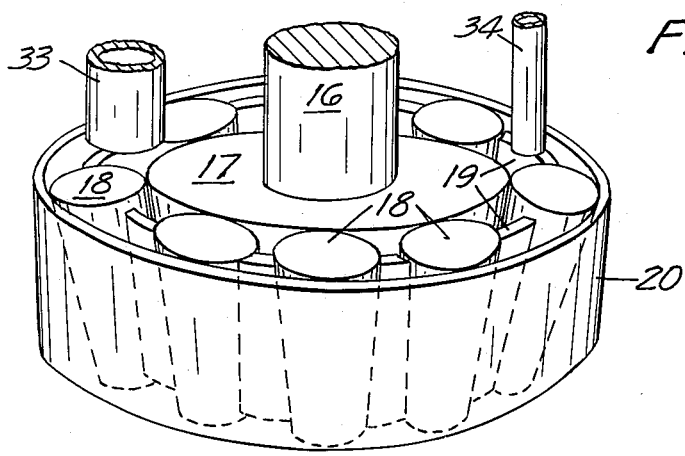
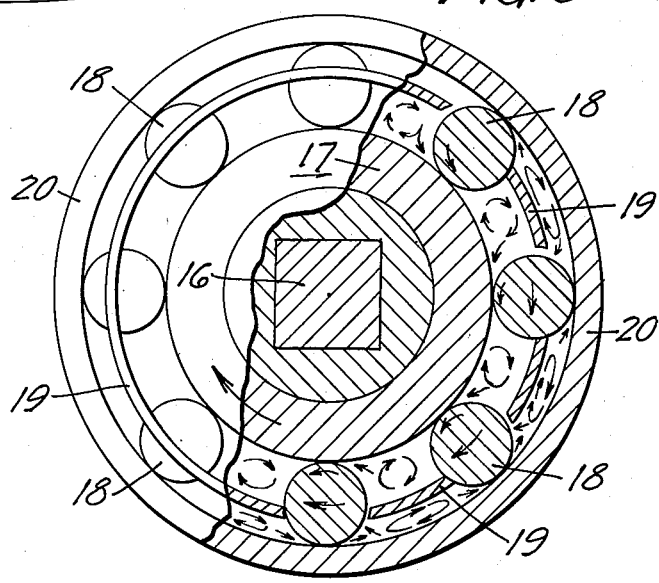
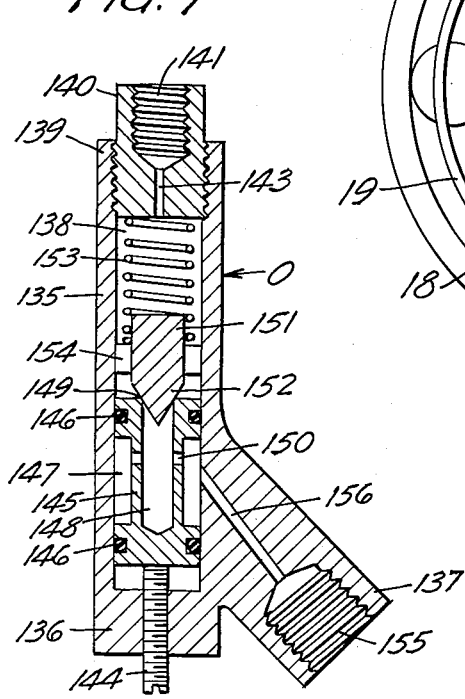
INVENTORS
HORACE THEODORE KERYLUK
TADIE KYRYLUK
BY Carpenter, Abbott, Coulter & Kinney
ATTORNEYS

United States Patent Office 2,970,773
Patented Feb. 7, 1961

2,970,773
FLUID MIXING AND APPLYING APPARATUS AND METHOD

Horace Theodore Keryluk, Boulder, Colo., and Tadie Kyryluk, Detroit, Mich., assignors to Minnesota Mining and Manufacturing Company, St. Paul, Minn., a corporation of Delaware Filed Oct. 19, 1959, Ser. No. 845,061

17 Claims. (Cl. 239—142)

The present invention is concerned with the rapid and effective mixing together of dissimilar materials, and has special application in mixing and applying plural component reactants. Our invention particularly concerns novel lightweight portable easily manipulatable mixing apparatus wherein such plural components can be mixed in the proper proportions and the mixed material applied in place, either intermittently or continuously as desired. This application is a continuation-in-part of both of our copending applications Serial No. 567,680, filed February 24, 1956, now abandoned, and Serial No. 728,714, filed April 15, 1958, now abandoned.

Examples of plural component reactants which may be mixed and applied in place in accordance with the present invention are things such as: (1) a high molecular weight diisocyanate and water, which rapidly interact with each other; (2) a liquid polyalkylene polysulfide polymer and an accelerator therefor, e.g. a lead peroxide dispersed in a liquid vehicle; (3) a curable epoxy material, e.g. the monomeric or polymerized reaction product of bisphenol and epichlorohydrin and an amine or other catalyst therefor; and (4) butadiene and styrene, in the presence of an appropriate initiator of polymerization, such as the well known rapidly initiating "redox" systems, so as to provide a rapid and continuous polymerization.

With many of these materials which chemically react very rapidly, it is desired to apply the materials in place immediately after they are mixed together, and, preferably, in the earliest stages of chemical reaction. For example, a suitable polymer prepared from castor oil and toluene diisocyanate containing in solution a measured amount of unreacted toluene diisocyanate may be mixed with a measured amount of a solution of N-methyl morpholine in water and immediately applied in place to provide a foamy cellular material which is useful as a heat insulation material, sound absorption material, lightweight structural reinforcement (as in portions of airplane structures, e.g. trailing edges of wings or tail assemblies, the interior of propeller blades), or in building units, e.g. with aluminum panels, etc.

In general, people heretofore have wanted plural component reactant mixes to have a long pot life, so that they are easy to handle and apply, and yet to cure quickly when in place, so as to allow rapid handling of the finished article and thereby simplify production problems in factories and such like. These are usually antagonistic desires in respect to the character of the reactant materials. If materials are to cure quickly when applied in place, in general they tend to have a very short application life. On the other hand, if materials have a long application life, or a long pot life, they tend to cure slowly when applied in place. When in place, sometimes heat may be used to accelerate the cure of the reactants, but this is not always convenient or even feasible, especially in large surface areas or in the interior of structures having complicated shapes, such as in airplanes or in instances where heat would warp or damage the structure in question.

Efforts have been made heretofore to meet this problem. For example, one proposed solution involves the use of a spray application device manufactured by the De Vilbiss Company, Toledo, Ohio, which operates on the principle of separately forcing liquids from two orifices (which may be concentric) and then playing jets of air in a cross-current relation to these streams, to provide atomization, some turbulence, and consequent mixing, with the thought that when these materials, thus mixed in mid-air, reach the surface to which they are to be applied, they will have become sufficiently mixed so that the reaction may continue and complete itself in the place where the materials are applied. While this has probably been the best method heretofore known or practiced for the spray application of plural reactants to a surface, yet this method has had a number of drawbacks or disadvantages.

One drawback has been the difficulty in maintaining the ratio of a relatively volatile liquid component to a relatively non-volatile component, due to partial evaporation of the more volatile component during application. Another disadvantage is the danger to or objection of the operator or others where one of the components is of toxic nature, because of the tendency to cause excessive fogging for some area around the place of application. Another difficulty or drawback has been the non-uniformity of cell structure, where a foam type of reaction product is desired.

Another type of mixing which has heretofore been employed for use with plural reactants operates generally on the principle of the De Vilbiss device just described, with this difference: a chamber is provided around the two sprays of reactants, which confines their initial mixing, and the streams of air impinge in a generally cross-current relation to the sprays of reactant materials, and against the outer wall of the chamber in which their mixing is confined. The mixed reactants then are emitted from the chamber, ordinarily in the form of an atomized mass of material. However, because of the nature of the equipment, such a procedure does not lend itself to "in place" spray application of uniform coatings or layers of material. This approach has many of the drawbacks and limitations as presented in respect to the method described in the preceding paragraph hereof, as will be obvious. While it has the advantage of confining the zone of mixing, and to that extent reducing fogging and toxic effects, yet it has the disadvantage that it is relatively difficult to deposit uniform thin liquid films over relatively large surfaces. Because of the heavy and cumbersome mechanical nature of the device, it is relatively difficult for one man to handle in spray applications.

Both types of prior art approaches have in general suffered the disadvantage that, where catalysts were needed, e.g. as one of the reactants, a stoichiometric excess of the catalyst had to be employed because of the inefficient use thereof, as a result of which an excessive amount of catalyst occurred in the final film or coating that was applied, which was a distinct disadvantage in certain instances and hurt the quality of the final coating or foam, especially where a stoichiometric amount of a volatile reactant is required for the best intimate physical properties of the cured reactant product.

It is a purpose of this invention conveniently and effectively to provide novel apparatus and procedures for mixing and applying plural reactants in the desired proportions, while largely avoiding the drawbacks and defects of prior approaches to this problem. Our apparatus and method will serve rapidly, exactly and controllably to intermix plural reactants and apply them in place, using the reactants essentially in the stoichiometric or chemical proportions in which they react or are preferred. The application can be of a continuous nature or it can as well be discontinuous, as where the application occurs over rather brief and intermittent intervals. Thus we produce a product of greater uniformity, e.g. uniform cellular structure, etc., depending upon the nature of the product desired, or one having superior physical properties, etc., while having a minimum of difficulty with fogging and/or toxicity to those engaged in or present at the operation. Wastage, even in discontinuous applications, is held to a minimum. An important further object is to accomplish these results through the use of equipment that is mobile or portable, convenient to use and light to handle and which is readily adaptable for a wide variety of uses. A further object of our invention is to achieve effective mixing of plural components in a very short interval of time, which might, in many cases, be controlled to provide effective mixing in less than a second, and, in any case, within a fraction of a minute, or at least a relatively short period of time, by the use of a combination of high turbulence and shear or squeezing actions, and under conditions to provide positive displacement of mixed ingredients and low dwell time in the mixing device. In many cases it is desired, and with our novel apparatus and procedures it is possible, to mix reactant materials and emit them from the mixing zone so that the reaction between them takes place substantially completely after they leave the mixing zone. For example, this is quite important in the production of foams or cellular structures from reactants. These and other objects and advantages will become apparent from the description of the invention as a whole.

Figure 1 is a side view showing our unitary mixing and applying device, together with a schematic representation of a proportioning supply system which supplies reactant ingredients in the desired proportions into the mixing chamber of said device;

Figure 2 is an end view of the mixing and applying device of Figure 1 taken from the forward or barrel end thereof, and including back pressure valve O in position;

Figure 3 is an enlarged sectional view of our device, taken along the lines 3—3 of Figure 1 with cap 112 rotated 90° for clarity of illustration;

Figure 4 is an enlarged elevational view, partially in section, of the mixing and applying device of Figure 1, also showing cap 112 rotated 90°, and showing in some detail the valve assemblies of the device;

Figure 5 is a further enlarged, somewhat diagrammatic perspective view of the mixing assembly of the device shown in Figure 1;

Figure 6 is an enlarged elevational view, partially in section, of the mixing zone in our device taken generally along the lines 6—6 of Figure 3;

Figure 7 is an enlarged elevational view partially in section of the variable orifice back pressure valve O of Figure 2; and Figure 8 is an enlarged sectional view of a modified mixing portion of a mixing and applying device hereof.

Our apparatus for mixing and applying plural component reactants and also the functioning thereof may be illustrated in conjunction with the accompanying drawing by reference to a specific example.

EXAMPLE I

With particular reference to Figure 1 tank A contains a supply of toluene diisocyanate castor oil prepolymer, with a measured excess of unreacted toluene diisocyanate, prepared according to the instructions set forth at the end of the present example. In general, it is a viscous liquid material, normally having a viscosity between 12,000 and 20,000 centipoises at 75° F. Tank B contains a supply of a foam producer and co-reactant, in this case water containing N-methylmorpholine, in the relation by weight of 3 parts of water to 1 part of N-methylmorpholine. The diisocyanate liquid from tank A is forced by controlled volume reciprocating plunger-type pump P through the line L, connected with nitrogen-filled pressure accumulator D (for dampening pressure undulations) and pressure gauge G, to our mixing and applying device to be described presently. Line R, connected at one end thereof to tank A and at the other end to line L at a point on the discharge side of pump P, provides a by-pass for the return flow of the pre-polymer when the mixing and applying device is temporarily out of use. A pressure relief valve V is interposed in line R for a purpose shortly to be described.

The water, N-methylmorpholine solution is passed from tank B by controlled volume reciprocating plunger-type pump P' through line L', connected with pressure gauge G', to the said mixing and applying device. Line R' connecting tank B and line L' at a point in the latter on the discharge side of pump P', and having a pressure relief valve V' interposed therein, provides a by-pass for the return flow of the said solution when the mixing and applying device is temporarily out of use.

With the by-pass systems employed in his proportioning supplying system, it is unnecessary to shut off pumps P and P' when the mixing and applying device temporarily is not being used, for example, when the operator takes a brief rest, or changes position, etc. Valves V and V' are set to open at a pressure just above the line operating pressure when the device is in use, i.e., when reactant materials are flowing through lines L and L' in the mixing and applying device. Thus when there is no flow in lines L and L', as when the mixing and applying device temporarily is out of use, line pressures tend to build up somewhat since the pumps remain operating. However, as the line pressure builds up, valves V and V' open and the by-pass systems then function keeping fluid flowing through the pumps P and P'.

The two pumps P and P', available in commerce from the Milton Roy Company of Philadelphia, Pennsylvania, are ganged together on a common shaft driven by a variable speed driver (motor and transmission) so that at all times the speed ratio one to the other is constant. Thus the pumps deliver the reactants to lines L and L' always in the desired volume ratio. In this example, the pumps are mutually adjusted so that four and one-fourth parts by weight of the material from tank B are introduced to the mixing chamber of the mixing and applying device for each 100 parts by weight of material from tank A (this relation being 4.95 parts to 100 parts by volume, respectively).

Lines L and L' are connected, through "quick disconnect" type connections, to our mixing and applying device as hereinafter described. The high molecular weight diisocyanate composition from tank A passing through line L and the aqueous morpholine solution contained in tank B and passing through line L' are thus introduced from the proportioning and pumping assembly into the mixing and applying gun.

Essentially, the applying gun comprises a rear barrel portion 11, a pistol grip type handle 12, the forward barrel portion 10 and the application adapter assembly 13. The rear barrel portion 11 houses power means M (Figure 3), here a 1/16 horsepower air motor. At the bottom of the handle 12 is a "quick disconnect" type connection C to which a flexible air line is connected in order to provide a pressurized air supply for driving the air motor.

Valve means, to be more particularly described hereinafter, positioned on each side of the forward barrel portion 10 control flow of the diisocyanate composition from tank A and the aqueous morpholine solution from tank B into the mixing chamber of the device. Such valve means in turn, are controlled and/or actuated by trigger 14. In this fashion the mixing of plural reactants and the application of the mixture with our novel device is completely controlled entirely by the operator through actuation of the single trigger. Starting and stopping of applying operations, as desired, is thus made easy.

Referring momentarily to Figure 3 the air motor M contained in the rear barrel portion 11 drives shaft 15 and therewith driven shaft 16, fixedly connected to shaft 15. Shaft 16, in turn, operates the roller bearing race assembly shown. Said assembly includes a frusto-conical inner race 17 fixed to shaft 16, and several tapered roller bearings 18, rotatably retained in proper spaced relation about the inner race 17 by the circumferential cage 19, through which they partially protrude. (See also Figures 5 and 6.) Surrounding said cage 19 and in contact with bearings 18 is the outer race 20 of the tapered roller bearing assembly, the inner surface of which defines a frusto-conical cavity within which the roller bearings 18 rotate on their own axes and planetarily travel about the inner race 17. In short, the elements 17, 18, 19 and 20, that is, the mixing elements, are assembled constructed like a conventional tapered roller bearing race assembly commonly used for front wheel bearings on automobiles. The inner surface of inner race 20 defines the mixing chamber or zone of the device.

The air motor may rotate drive shafts 15 and 16 at a speed of the order of 500 to 10,000 r.p.m. With the particular reactants being mixed, now under description, a rotational speed of the order of 3,000 to 4,000 r.p.m., or higher, is satisfactory.

When the trigger 14 of the mixing gun is squeezed whereby the two reactants (from tanks A and B) are allowed to enter the mixing zone in the forward barrel portion 10 as above described and shown, with the shaft 16 and inner race 17 rotating at high speed, the tapered roller bearings 18 are moving in a planetary fashion, that is the bearings 18 rotate at high speed about their respective axes and travel within the confines of outer race 20 about the axis of the inner race 17, as generally indicated in Figure 5 of the drawing. While we do not know with certainty the paths of flow of the materials to be intermixed, yet for the purpose of illustration, and not to be limited by theory, we have given some indication in Figure 5 of the flow paths taken by the materials due to such planetary, and rotational, movement of the tapered roller bearings. From Figure 5 it will be seen that the reactant materials are subjected to a great deal of turbulence and also to a shearing, or wiping or squeezing action between and adjacent the roller bearing 18 and the inner race assembly 17, and also between and adjacent the roller bearings 18 and the inner surface of the outer race 20, and themselves travel in somewhat of a planetary path. While in this path, however, the materials progress axially through the mixing zone as a result of the positive pressure exerted by the pumps. In passing through the mixing zone the transverse distance traveled by the materials is extremely great as compared with the axial distance traveled through the mixing zone. The materials are very quickly mixed, the mixing occurring principally in the transverse direction, and are emitted from the mixing zone, through reducing chamber 21 and the passage 22 and 23, thence through outlet orifice 24, as shown in Figure 3.

Where atomization of the mixed reactants, as with air or gas, is desired, such air or gas may be introduced under pressure, as hereinafter described into annular chamber 25 and is emitted at high velocity through the annular orifice 26, concentric with outlet orifice 24. If desired, air may also be emitted at an angle to the stream of mixed reactants through passages 27 in wing tips 28, as where it is desired to have the mixed reactants spread out into a fan-shape or other specially shaped spray pattern. In many instances, however, the openings 27 are sealed off or omitted entirely.

The mixed reactants leaving the orifice 24, atomized by the air forced out through the annular orifice 26, may be applied in place where desired; for example, so as to provide an insulation having a thickness of the order of one to two inches. Such an insulation will be a light, uniformly cellular material, which will normally adhere to and stay in place on a clean metal surface. Such a material, when mixed and applied in accordance with the teachings hereof lends itself to a production line operation, since it will foam in place and set up to a strong, coherent mass at ordinary room temperatures within a few minutes, e.g., 5 minutes, and becomes fully cured within a few hours.

Our entire gun, as shown in the lower portion of Figure 1, exclusive of the connecting lines L and L', has an overall length of not more than about 8 inches, and a total weight of only about 4½ pounds, when the portions making up the mixing chamber, the roller bearing race assembly and the spray nozzle are made of steel.

Other advantages of our mixing procedure and device employed, as hereinabove described, are inherent in this application, e.g., the avoidance of excessive fogging, the uniformity of the mixing and cell structure, the getting of the material in place before the reaction has proceeded too far, and other advantages.

The reactants of the present example may be mixed and applied in place without the use of any air for atomization, and such a procedure is desired in certain instances, as for example where the material is being applied in enclosed cavities or molds. The density of such a product can be controlled so it is approximately as low as that resulting from the spray application.

One or both of the tanks A and B may be jacketed to permit circulation of steam or hot water in the jacket, so as to control the temperature of the contents as desired. In general, it is desired to maintain the contents of the diisocyanate mix, as above described, at an elevated temperature, and thus keep its viscosity reduced to a convenient range.

In practical spray operations on a commercial scale approximately 17–18 gallons per hour of the reactants of Example I are mixed and sprayed in place using this device; although the capacity of this device is actually much greater. A specific proportioning apparatus for such an application utilizing as the pump P (for the diisocyanate component) a controlled volume reciprocating plunger-type pump having capacities of 46 gallons of water per hour and 800 pounds per square inch pressure and employing "Hastelloy C" alloy balls and stainless steel seats. The pump P' (for the aqueous N-methyl morpholine) likewise is a controlled volume reciprocating plunger-type pump, has capacities of 5.4 gallons of water per hour and 7200 pounds per square inch pressure and has "Hastelloy C" alloy balls and stainless steel seats. The drive means is a ¾ horsepower electric motor with variable speed hydraulic driver. The two pumps ganged on a common shaft and the drive mechanism can be obtained in commerce as an integral unit from the Milton Roy Co. of Philadelphia, Pennsylvania, under the trade designation GMD 4-553-44/61SM quadruplex pumping unit. The pressure release valves V and V' in the bypass, line R and R', respectively, are rated at 250 pounds per square inch maximum opening and 365 gallons of water per hour. The prepolymer in the tank B is heated to a temperature of about 120° F. such that it has a viscosity of about 500 cps. A 10 cubic inch nitrogen-filled accumulator D is used.

Employing the apparatus as just described, the resulting foamed product of the reactants described in this example result in a foamed product having a finished foam density of only about 2 pounds per cubic foot.

The entire proportioning and pumping apparatus, that is, the pumps P and P', tanks A and B, bypass lines, accumulator D and gauges G and G', conveniently can be mounted on a single chassis, which in turn is mounted on wheels for mobility. In such instance the lines L and L', from some point on the chassis downstream of the gauges G and G', to a point where they connect with the mixing gun, will be flexible so the operator of the gun can move about during the spraying operation.

Conveniently, one or both of tubes L and L' will be double-walled tubes, where normally viscous material is to pass therethrough, so as to permit circulation of hot water or other fluid therearound, to prevent undue cooling of the reactant, prior to its entry into the mixing chamber. Particularly is this true when the lines L and L' must be quite long to permit the operator to move the mixing and applying gun some distance without necessitating moving the pumping and proportioning apparatus.

*Further detailed description of mixing and applying gun*

Our novel lightweight unitary mixing and applying gun will now be described in detail. Referring principally to Figures 1–4, the forward barrel 10 is provided with a recess 30 in the rear thereof. The rear portion of said recess is internally threaded for attachment as shown to the rear barrel 11. At its forward end barrel 10 is provided with a cylindrical extension 31, said extension along with the forward end of the barrel 10 internally thereof defining a cavity within which is contained the roller bearing race mixing assembly.

Barrel 10 is centrally bored, the bore being lined with bearing sleeve 32, within which shaft 16 rotates. At its rearward end shaft 16 is affixed to power shaft 15 by a threaded connection. To the forward end of shaft 16 which extends into the mixing cavity defined by extention 31 is affixed frusto-conical inner race 17 of the roller bearing race assembly. Retained about the inner race 17 are the roller bearings 18 and cage 19 therefor. Inner race 17, roller bearings 18 and cage 19 are disposed within the mixing chamber or zone of the device.

Just radially outwardly of the inner race 17 extending rearwardly into the barrel 10 from the rear or back surface of the mixing chamber are mixing chamber entry ports 33 and 34 (Figure 3). These ports are positioned generally opposite one another on each side of the shaft 16. Since, as will be shown, the higher volume prepolymer reactant enters the mixing chamber through it, port 33 is somewhat larger than port 34.

Longitudinal shoulder bosses 35 and 36 bulging laterally of the gun barrel are formed on each side of the barrel 10. These bosses 35 and 36 are each bored from the rear along the length thereof to define chambers 37 and 38, respectively, therein. Said chambers do not, however, extend all the way through to the forward end of the bosses 35 and 36. Connecting chambers 37 and 38 with ports 33 and 34, respectively, are laterally extending passages 39 and 40. These passages conveniently may be formed by drilling through the side of shoulder bosses 35 and 36 (at points opposite the forward ends of chambers 37 and 38) and laterally into barrel 10 until the rearward ends of ports 33 and 34 are reached. Then the portions of the sides of the shoulder bosses externally of the chambers 37 and 38 can be plugged, the plugs 41 and 42 being indicated by broken lines.

The shoulder bosses 35 and 36 further are drilled from underneath at points spaced rearwardly of the respective juncture of chambers 37 and 38 and passages 39 and 40 to provide inlets 43 and 44 therein communicating with chambers 37 and 38 respectively. These inlets are tapped for connectors 45 and 46 through which tubes 47 and 48, respectively, are connected to and communicate with inlets 43 and 44, chambers 37 and 38, passages 39 and 40, and finally mixing chamber entry ports 33 and 34. Tubes 47 and 48 terminate at their lower ends in quick disconnect fittings 49 and 50, respectively. At their lower ends said tubes are supported by butt plate 51 affixed at its rearward end to handle 12. When the mixing gun is connected with the proportioning supply system, line L is connected to tube 47 through connecting fitting 49 and line L' is connected to tube 48 through connection fitting 50, unless (as is the case in the present example), for a purpose later to be described, variable orifice back pressure valve O (Figure 2) is utilized. In this event, valve O is connected to connection fitting 50 and line L' is connected to the inlet side of valve O.

Disposed in mountings therefor at the forward end of chamber 37 and 38, adjacent the junction of said chambers and passages 39 and 40, respectively, are valve seats 52 and 53. These valve seats are disposed forwardly (i.e. downstream) of points at which inlets 43 and 44, respectively, enter chambers 37 and 38. At the open end thereof, to the rear of bosses 35 and 36, chambers 38 and 39 are drilled and tapped to receive two threaded bushings 54 and 55, respectively, said bushings having knurled head flanges which facilitate their insertion and removal from the shoulder bosses 35 and 36. Said bushings 54 and 55 are center-bored; and slidably extending therethrough into chambers 37 and 38 are elongate shafts 56 and 57 which terminate within said chambers at their forward ends in valves 58 and 59, the latter being of beveled shape so as to cooperate with their respective valve seats 52 and 53. It will be noted that valve 58 and seat 52 therefor are somewhat larger than their respective counterparts 59 and 53 to accommodate the larger volume prepolymer reactant. At their forward ends, that is, those which extend into chambers 37 and 38, bushings 54 and 55 are provided with a depression immediately about shafts 56 and 57. Sealing means, for example O-rings 60 and 61 are seated in said depressions and fit snugly about shafts 56 and 57, thereby sealing bushings 54 and 55 against leakage of fluid therethrough along said shafts. O-rings 60 and 61 are retained in position by washers 62 and 63 inserted into the tapped bushing sockets, bushings 54 and 55 being turned up snugly against the washers to retain them in place. The shafts 56 and 57 extend rearwardly to engage spring return assemblies shortly to be described.

Barrel 10 is also provided with a longitudinal shoulder boss 64 on the underside thereof (Figure 4), which extends forwardly from the rearward end of said barrel 10 for approximately three-fourths of the length thereof. Said shoulder boss 64 is drilled from the forward end thereof to define chamber 65, extending nearly, but not entirely, throughout the length of boss 64. A much smaller aperture is drilled through the rear wall of boss 64 into chamber 65, concentrically with the latter. Shaft 66 slidably extends through said aperture into chamber 65.

Cylindrically shaped member 67, slidably journaled about shaft 66, and having a diameter of just slightly less than that of chamber 65, is positioned to the rear of the latter. Said member 67 is provided with a recess at the rear thereof to accommodate an O-ring 68 snugly journaled about shaft 66, said O-ring serving to seal said chamber 65 from leakage about the shaft at the rear of boss 64. On the forward end of said shaft 66 is retained air valve 69 having a frusto-conical forward end designed to cooperate with a valve seat hereinafter to be described. Journaled about shaft 66 between member 67 and the rear face of valve 69 is coil spring 70 which urges valve 69 and therewith shaft 66 to a forward seated position, said spring also retaining member 67 in position. Rearward of the normally seated position of valve 69, shoulder boss 64 and aperture is drilled (and tapped) through the underside of boss 64 into chamber 65 to provide for threaded connector 71 through which tube 72 is connected to, and communicates with said chamber 65. Tube 72 extends downwardly in a manner similar to that of tubes 47 and 48 and terminates at its lower end, which is supported by butt plate 51, in a quick disconnect fitting 73 to which a compressed air line can be connected.

Rear barrel portion 11 is connected to forward barrel 10 through a forwardly extending threaded portion which cooperates with the internally threaded recess in barrel 10. On each side of rear barrel 11 is provided longitudinal shoulder bosses 80 and 81. These are spaced from, and aligned with, previously mentioned shoulder bosses 35 and 36, respectively, of forward barrel 10 when the barrels 12 and 10 are assembled. Bosses 80 and 81 are bored and threaded entirely throughout the length thereof to accommodate elongate threaded bushings 82 and 83 which have knurled head flanges to facilitate their insertion and removal. The respective threaded shanks of said bushings are hollowed out to define chambers 84 and 85 therein which, when the bushings are in place, align respectively with chambers 37 and 38. Retained in said chambers 82 and 83, abutting the rearward ends thereof, are coiled springs 86 and 87.

The rearward ends of shafts 56 and 57 extend into the chambers 84 and 85, respectively. At their rearward extremities, said shafts are provided with spring engaging flanges 88 and 89 which respectively bear against springs 86 and 87. The lengths of shafts 56 and 57 are such that normally coil springs 86 and 87, respectively, urge valves 58 and 59 into a normally seated position on their respective valve seats 52 and 53. As will be apparent, the compressive force on the springs urging the valves into position can be controlled by the degree to which bushings 82 and 83 are turned into shoulder bosses 80 and 81.

Rear barrel portion 11 is also provided with a laterally extending shoulder boss 90 (Figure 2), the lateral end surfaces of which are squared off perpendicularly. A bifurcated yoke 91, extending around below and about rear barrel 11 as shown, is pivotally attached at the upper ends of its arms 92 and 93 by means of bolts 94, to the lateral surfaces of lateral shoulder boss 91. Extending rearwardly thence downwardly from yoke 91 is trigger 14. Actually yoke 91 and trigger 14 are formed from a single casting which may be termed the trigger member. Thus trigger 14 and bifurcated member 91 rotate over a limited arc about bolts 94 when said trigger is moved rearwardly or forwardly.

Trigger 14 and yoke 91 cooperate mechanically with shafts 56, 57 and 66 (and the respective spring return assemblies for said shafts) to control the actuation of valves 58, 59 and 69 as follows. The arms 92 and 93 of said yoke 91 are provided with longitudinally extending apertures 95 and 96 through which movably pass shafts 56 and 57, respectively (see Figures 3 and 4). Said arms 92 and 93 also are recessed on the rear surfaces thereof concentrically with apertures 95 and 96, thereby to provide seats for annular pull plates 97 and 98 slidably journaled on shafts 56 and 57, respectively. Said pull plates are provided with set screws (not shown) or equivalent for adjustably locking them in the position desired on their respective shafts.

Likewise, trigger 14, adjacent the juncture of the latter and yoke 91 is provided with an aperture 99 through which shaft 66 movably extends. Said trigger is recessed at the rear surface thereof concentrically with aperture 99 to provide a seat for annular pull plate 100. The latter is slidably journaled about shaft 66, but as in the instance of pull plates 97 and 98, is provided with a set screw or other means for locking it in the position desired on said shaft.

Pull plates 97, 98 and 100 are locked into position on their respective shafts 56, 57 and 66 such that they are disposed slightly rearwardly of the yoke 91 and trigger 14, when the latter is in a forward, i.e., unpulled, position when valves 56, 57 and 69 are closed, i.e., seated on their respective valve seats.

When it is desired to open the valves, trigger 14 merely is squeezed or pulled rearwardly whereby pull plates 97, 98 and 100 are engaged by the aforesaid seats therefor in the yoke 91 and trigger 14, and as the trigger is squeezed rearwardly still further, pull plates 97, 98 and 100 and therewith shafts 56, 57 and 66 and valves 58, 59 and 69, respectively, travel rearwardly against return springs 86, 87 and 70 thereby unseating said valves. When it is desired to close the valves, the pressure on trigger 14 is released and return springs 86, 87 and 70 urge their respective valves to a seated or closed position. At the same time, pull plates 97, 98 and 100 travel forwardly carrying yoke 91 and trigger 14 to a forward position. As can be seen, where desired for a purpose hereinafter to be explained, pull plates 97, 98 and 100 may be so positioned on their respective shafts so as to be engaged by the yoke and trigger at different times as the trigger is pulled rearwardly. In this instance, the valves will be caused to open in the order in which their respective pull plates are engaged. Upon release of trigger 14, the valves will close in the inverse order in which they were opened.

The lower end of trigger 14 terminates in a forwardly extending tang 101 designed to prevent the fingers of the operator inadvertently from sliding downwardly off the end of the trigger. Also, just adjacent to and below tang 101 (when the trigger 14 is in fully squeezed or retracted position) is a second tang 102 extending forwardly from handle 12. Said tang 102 is designed to keep the operator holding the device from inadvertently sliding his fingers which are wrapped around the handle 12 upwardly along the handle so as to be caught between it and the trigger 14.

So that it may conveniently be hung or fastened, for example, to the carriage for the proportioning unit when not in use, the gun may be provided with a hook 103 extending upwardly from rear barrel 11.

Affixed to the forward end of the barrel 10 is application adapter assembly 13 which comprises a retainer adapter 110, fluid tip or nozzle 111 and air cap 112. Retainer adapter 110 is provided with a rearwardly extending cylindrical extension 113, the outer diameter of which is just smaller than the inner diameter of extension 31 of barrel 10, so the former snugly will slip-fit into the latter. Fixed within the cavity defined by extension 110, for example by a so-called "press-fit," is the outer race 20 of the mixing assembly within which, in the mixing chamber, roller bearings 18, cage 19 and inner race 17 rotate and/or travel. Forward barrel 10 and retainer adapter 110 are assembled with outer race 20 in place such that the end surfaces of said outer race abut adapter 110 and barrel 10 as shown. An O-ring seal 114 is disposed about said outer race 20 between extension 113 and the forward surface of barrel 10.

The rear surface of adapter 110 centrally is provided with a conically shaped recess defining reducing chamber 21. Retainer adapter 110 is also center bored to define passage 22, and is drilled and tapped at its fore-surface to provide a threaded socket within which is retained a mating threaded portion of fluid nozzle 111. The latter is also center bored to define passage 23 of the same diameter as passage 22. Passage 23 terminates at its forward end in outlet orifice 24.

Referring momentarily to Figure 4, retainer adapter 110 is provided on its underside with a shoulder boss 115. Said shoulder boss extends rearwardly beyond said retainer adapter so as to abut the forward end of shoulder boss 64 of forward barrel 10 when retainer adapter 110 and barrel 10 are assembled. Said shoulder boss 115 is drilled through the entire length thereof to provide a passage 116 somewhat larger in diameter than chamber 65. A right angle passage 117 is provided in retainer adapter 110 which extends from passage 116, as shown, upwardly through shoulder boss 115 into retainer adapter 110 and thence forwardly through the forward end surface of the latter into the annular chamber 25 partially defined by externally threaded forward extension 118 of retainer adapter 110 (Figure 3).

Retainer adapter 110 is removably retained in its assembled position with forward barrel 10 by means of hollow bolt 119, which extends rearwardly into and through passage 116 of shoulder boss 115. The rearward end 120 of said bolt 119 is threaded and extends into mating threaded socket therefor in boss 64 at the forward portion of chamber 65 therein as shown. The shank of bolt 119 is hollowed out to provide cavity 121 therein, and at the rearward end of said cavity conical valve seat 122, the latter being so configured as to cooperate with valve 69. Toward the mid-portion thereof, the exterior of the shank of bolt 119 is necked-down so that said necked-down portion defines an annular chamber 123 with the wall of passage 116. Apertures 124 in the necked-down portion of said shank connect the cavity 121 with chamber 123. Forwardly of the necked-down portion of said bolt 119 defining chamber 123, the shank of said bolt is provided with an annular groove wherein is disposed an O-ring seal 125. Said shank is provided with a similar groove rearwardly of said necked-down portion wherein is disposed a further O-ring seal 126.

About the fluid nozzle 111, and concentric therewith, is positioned the annular, somewhat conical air cap 112 affixed to the retainer adapter 110 by means of an internally threaded knurled ring 130 extending about said cap, said ring being turned onto the thread extension 118 of said adapter 110. The forward end of the air cap 112 terminates in a pair of diametrically opposed wing tips 28. Passages 27 which extend through the tips 28, connect with the annular chamber 25, defined by the inner wall of the air cap 112 and the outer circumferential wall of the fluid nozzle 111, and terminate at the forward surface of the wing tips 28, at an angle with respect to the axis of the assembly.

From the foregoing description of our device it will be seen that the roller bearing race assembly mixing components can be replaced simply by removing bolt 119, separating retainer adapter 110 from forward barrel 10, thence removing the inner race (and therewith, cage 19 and roller bearings 18) from shaft 16. For further disassembly, air cap 112 is removed from retainer adapter 110 by removing ring 130. Forward barrel 10 is separated or unscrewed from rear barrel 11 after first disassembling the valves and shafts 56 and 57. This is accomplished by loosening pull plates 97 and 98 and by removing bushings 82 and 83 and 54 and 55. (If necessary larger valve 58 can be removed from shaft 56 to which it is threadably attached.) Reassembly, of course, will be in the reverse order of disassembly.

In the operation of our novel mixing and applying gun, reactants flow to the gun from tube 47 (and line L) and from tube 48 (and line L'). A tube from a supply of compressed air to drive the air motor M is connected to connection C. Said motor commences to operate as soon as this connection is made. That is, motor M operates independently of the actuation of trigger 14. Where atomization of the mixed reactants is desired, as it is in the foam spraying operation of the present example, compressed air flows to the gun from tube 72 (and from a supply line attached to the latter at connector 71). When it is desired to mix reactants and apply the same in place with our mixing and applying device, trigger 14 is squeezed or pulled, whereby the several valves 58, 59 and 69 (if atomization air is utilized) are opened. Reactant material entering the gun through tube 47 passes through inlet 43, through chamber 37, then through the annular space between the open valve 58 and its seat 52, through passage 39 and finally through entry port 33 into the mixing chamber. Reactant material entering the gun through tube 48 passes through inlet 44, through chamber 38, then through the annular space between open valve 59 and its seat 53, through passage 40 and finally through entry port 34 into the mixing chamber. Compressed air entering the gun through tube 72 passes through connector 71, through chamber 65, through the annular space between open valve 69 and its seat 122, thence into cavity 121, through apertures 124 and chamber 123, through passage 117, thence into annular chamber 25, through outlet orifice 24, and, if desired, through passages 27.

As previously noted, the position of pull plates 97, 98 and 100 can be adjusted on their respective shafts such that they are engaged by yoke 91 and trigger 14 simultaneously, and thereby the valves are opened simultaneously when trigger 14 is pulled. Or the pull plates can be positioned so they are successively engaged by yoke 91 and trigger 14 in any desired sequence so that the valves will open in sequence desired. As will be apparent, the first pull plate engaged when the trigger 14 is pulled will be the last released when the trigger is freed. Correspondingly the second pull plate to be engaged will be the second released, and the last to be engaged will be the first to be released. Thus the valves will close upon release of the trigger in the inverse order in which they were opened.

When spraying foaming reactants, as is the instance in the present example, we find it preferable to position pull plate 100, controlling air valve 69, so that said valve 69 opens in advance of the opening of valves 58 and 59 (controlling the flow of reactant materials). Thus, air valve 59 closes subsequently to the closing of valves 58 and 59 upon release of trigger 14. Then, when a spraying operation is to be stopped for a short time, for example in the order of somewhat less than a minute to several minutes, the trigger is released sufficiently to close valves 58 and 59 but insufficiently to close air valve 69. Two self-cleaning features of our device then simultaneously take place: First, since the operation of motor M is controlled independently of trigger 14, the action of the roller bearing race mixing assembly itself (the converging direction of which is downstream, i.e., toward outlet orifice 24) pushes mixed reactant materials from the mixing chamber; and second, the compressed air flowing out of orifice 26 draws residual mixed material from the chamber 21 and passages 22 and 23 and propels it from orifice 24. The spraying operation thus continues until the device substantially is empty. It is to be noted that before resuming the spraying operation it may then be desirable briefly to direct the initial portion of mixed materials emitted into a waste receptacle, since such portion invariably will contain a few residual fragments of mixed components, by this time fairly well "set up," which it may be undesirable to apply to the object being sprayed or coated.

Also, we prefer to have the pull plate controlling catalyst valve 59 so positioned that valve 59 opens prior to (and thus closes subsequently to) the opening and closing of valve 58. In this fashion, the device may be cleaned and flushed with solvent when a spraying operation has been completed so that the gun is to be out of operation for some time, e.g., for several hours, or when it is desired to change the mix and apply different reactant materials with our device. Line L' (through which the catalyst component passes) and valve O are then detached from connector 46 and in their place is attached a line from a suitable pressurized solvent supply for the fresh unset or uncured mixtures, e.g., n-butyl alcohol in the present example. The trigger is then squeezed a distance just sufficient to open valve 59 but insufficient to open valve 58, and the device is directed to spray the solvent in a waste receptacle while it is cleaned or flushed out.

When the mixing and applying operation resumes, and all removed supply lines appropriately have been reattached, a small amount of the mixed material initially should be directed into a waste receptacle as this material will have mixed with it the residual solvent and perhaps some fragmentary reactant material previously contained in the device.

It is to be noted that where our mixing and applying gun is to be used for continuous operations, or operations where spraying continues for long periods, as for example in the operation described in Example III, hereinafter, it may be desirable to provide a locking assembly on handle 11 or trigger 14 whereby the trigger may be locked into a pulled or retracted position, thereby saving the operator from having to hold the trigger in a retracted position with his hand.

When the trigger 14 of the gun is squeezed and the valves controlling the flow of fluid reactants and the mixing chamber are actuated, there is a sudden and very rapid fluid pressure drop within the lines or tubes containing the reactant components. This is of significance, particularly where the volume ratios of the components to be mixed are quite high, as is the case in Example I. Since the pumps are ganged on a common drive shaft, it takes a greater amount of time for the pump (P'), pumping the lower volume component, to build the pressure in its line back up to an operating equilibrium pressure, than it does for pump P to do the same. This can complicate intermittent operations. The pressures of the plural reactants must be nearly the same as the reactants enter the mixing chamber of the device. Otherwise the fluid reactant at the greater pressure fills the chamber and exerts a back pressure against the other reactant, which the latter (due its lower pressure) could not overcome. The result is that the reactants are disproportionately mixed (if mixed at all). However, unless some remedial means is provided, just this situation occurs for a time where there is a substantial disparity between the volumes of the components being mixed; this being due, as above mentioned, to the relatively longer pressure-recovery time required for the lower volume component. Moreover, the period of pressure buildup can be a matter of minutes. Obviously, in practical and commercial intermittent-type mixing and applying operations, a wait of such extent for pressure buildup to occur so the reactants are again mixed in proper ratios could not be tolerated.

We have overcome this important difficulty, in operations where the volume ratios of components are quite disproportionate, by employing a one-way variable-orifice back pressure valve O in the line containing the fluid reactant which is employed in smaller volume. Referring now to Figure 7, the variable orifice back pressure valve O comprises a body 135 having bifurcated ends 136 and 137. A cylindrical chamber 138 extends along the length of said body 135 from the signal end 139 (which is the downstream end of the valve), but not completely through the opposite end 136. Adjacent end 139, body 135 is internally threaded to receive retainer plug 140. The exterior end of the latter is drilled and tapped to provide socket 141 for the threaded end of fitting 142 (shown only in Figure 2) which is the mate for connector 50. A discharge port 143 passes through plug 140 to connect socket 141 with chamber 138.

End 136 is drilled through and tapped for adjusting screw 144. Said adjusting screw controls the position of generally dumbbell-shaped valve seat member 145. The latter contains O-ring 146 adjacent each end thereof to prevent passage of fluids between the ends of member 145 and the wall of chamber 138. An annular chamber 147 is thus defined externally of said seat member 145 between the ends thereof and the wall of chamber 138.

The valve seat member 145 is recessed, from the end thereof toward end 139, to provide cavity 148 which terminates at its open end in a beveled edge defining valve seat 149. The central portion of the valve seat member 145 contains apertures 150, as shown, communicating the annular chamber 147 with cavity 148. A valve 151, having a conical end 152 for cooperation with seat 149 to define therewith a variable orifice, is urged against the valve seat 149 by means of a compressed coil spring 153. Said spring is compressed between the internal face of plug 140 and laterally extending symmetrically spaced spacer guides 154 (two shown) which also serve to maintain valve 151 within chamber 138 in line with valve seat 149.

The lateral end 137 of body 135 serves as the inlet and is provided with a socket 155 for a connector (not shown) to which line L' (Fig. 2) is attached. An inlet port 156 connects socket 155 with annular chamber 147.

It will thus be seen that the degree of compressive force exerted by spring 153 against valve 151 to urge the latter to a seated position is controlled by the position of member 145, the position of which, in turn, is controlled by adjusting screw 144. Preferably, by means of the adjusting screw 144, the spring 153 is adjusted in compression such that it will urge valve 151 to a fully seated position on the valve seat 149 against a fluid force exerted in cavity 148 upon the conical end 152 of valve 151 roughly equivalent to the operating fluid pressure as shown on gauge G' when mixing gun is in use. In the present example, utilizing the proportioning supply system described, this pressure is about 150 p.s.i.

An explanation, although we do not intend to be limited thereto, of the operation of the variable orifice back pressure device is as follows: Prior to actuation of the trigger 14 of the mixing and applying gun, i.e., when there is no flow through lines L and L', valve 152 is fully seated. Upon actuation of the trigger 14 of the mixing and applying device, the fluid reactants commence to flow into the mixing chamber thus causing an instantaneous and marked pressure drop along tubes 47 and 48 (and in the polymer supply containing no back pressure valve O along line L). As the pressure drop in tube 48 extends upstream into the chamber 138 of the back pressure device, valve 151 snaps open in response to the pressure thereupon in cavity 148. A pressure drop then occurs upstream past valve 151 into the cavity 148 (and L') to the extent where there is insufficient force upon valve 151 to keep it open, at which time the valve seats or closes in response to the force of spring 153. Thus the pressure drop does not continue to drop in the line L' below the pressure at which the valve 151 closes. However, since the drop downstream of valve 151 is considerably greater than the pressure upstream thereof valve 151 again unseats slightly, whereupon the pressure drop spreads upstream and the valve closes. As these undulations lessen the valve 151 neither fully seats nor becomes fully open. Instead it closes and opens just slightly in response to the pressure undulations thereby to decrease and increase the orifice defined between it and valve seat 149. As these increases and decreases occur (and the time interval is very slight—perhaps only a second or so) the pump P' is building pressure in line L'. When the rate of pressure buildup by the pump is equivalent to the operating line pressure, the system operates normally. In any event, the immediate pressure drop in line L', when the trigger 14 is pulled is not reduced to zero (as it would be but for the presence of back pressure valve O) but rather only to a point on the inlet side of back pressure valve O just below the preadjusted pressure at which valve 151 opens (which is very nearly equal to the operating pressure of the device). By employing this back pressure device, the time necessary to rebuild the pressure drop to normal is reduced to a very few seconds, for example only about three, as contrasted with the minutes required to rebuild this pressure where no back pressure device is employed in the line. By this interval the pressure in line L has been built-up to normal and the exact proportion of plural reactants is again being mixed. During this short interval of a few seconds the initial mixed matter can be directed into a waste receptacle.

Although the back pressure valve O is unnecessary unless there is a rather substantial difference of respective volumes employed, it is often desirable to employ such a device in each reactant component line instead of only in the line of the lower volume reactant. The back pressure valve O should be employed as close to the mixing device as practicable. The greater the distance between it and the device, the longer it will take to rebuild the pressure drop downstream of the device. Hence, we employ the back pressure device right on the gun itself, it being sufficiently small and light-weight as to add no material inconvenience to the operation of the mixing and applying gun.

It is to be noted that when very nearly equal proportions of reactants are to be mixed (in which case back pressure valve O may be unnecessary) it may be desirable to employ an accumulator, such as nitrogen filled pressure accumulator D, for dampening pressure undulations caused by the pumps in each of the lines through which reactant materials flow to the mixing device.

In the specific mixing embodiment described, the port 33 through which the reactant component from tank A flows has a diameter of about 0.25 inch. The somewhat smaller port through which the reactant from tank B flows has a diameter of about 0.10 inch. The assembly of the inner race 17, the tapered roller bearings 18 retained in position by cage 19 and the outer race 20 consists of a standard tapered roller bearing assembly. For example, the assembly employed in the device above described is a single row tapered roller bearing assembly No. A2047 X A2126, presently manufactured by the Timken Roller Bearing Company, of Detroit, Michigan. In this assembly, the inner race 17 has a diameter at the base (excluding the bearing retaining shoulder) of approximately $21/32$ inch and a diameter at the smaller end (excluding the retaining shoulder) of approximately $5/8$ inch. The outer diameter of the outer race 20 is about $1\frac{1}{4}$ inches. The frusto-conical surface of the outer race 20 has a diameter at the base of about $7/8$ inch and a diameter at the smaller end of about $5/8$ inch. The depth of the inner race 17 is about $1/2$ inch and that of the outer race 20 is about $5/16$ inch. The distance between the mixing zone and orifice 24, i.e., the combined lengths of chamber 21 and passages 22 and 23, through which the mixed materials pass after leaving the mixing zone prior to emission from the device, is about $1\frac{1}{2}$ inch. The time required for the mixed materials to be emitted from orifice 24, after they have been mixed in the mixing chamber, will, of course, depend, at least in part upon the distance between the mixing assembly and orifice 24. Hence, by varying this distance through appropriate alteration of the length of nozzle 111 (and corresponding extension of surrounding parts), the amount of reaction which the mixed materials undergo before being emitted from the orifice 24 can be controlled to some considerable extent.

Although the mixing and applying gun here described is designed for only two plural component reactants, it will, of course, be apparent that more than two rectants may be utilized by adding additional ports, valves, valve return assemblies, etc., all as will be apparent from the foregoing description. Moreover, if desired, for example where the character of the reactant materials requires a relatively long mixing time, two or more roller bearing race assemblies in series can be utilized in our novel mixing and applying apparatus. In this regard, reference is now made to Figure 8, where two roller bearing race assemblies are employed in series. Shafts 16a extends through added inner race 17' and into the inner race 17 which is fixedly (but removably) attached to the shaft in abutting relationship with inner race 17'. Similarly to the first mixing assembly, roller bearings 18', retained in proper spaced relation by cage 19' are disposed about inner race 17'. Barrel extension collar 160 contains a rearward extension 161 identical in radial thickness and diameter to that of extension 113 of retaining adapter 110. Said extension 161 retains by a press fit outer race 20 with its rearward edge bearing against O-ring seal 114 which is disposed about outer race 20. A radially inwardly extending flange 162 abuts the forward surface of outer race 20 and the rearward surface of outer race 20a, and serves to fill the space between these so they will be disposed in the correct longitudinal relationship with their respective inner races and roller bearings. Said barrel extension collar 160 is also provided with a forward extension 163 identical in radial thickness and diameter to that extension 31 of forward barrel 10. Extension 113 of retaining adapter 110, which retains outer race 20a, thus slips snugly within said extension 163. An O-ring seal 164 is disposed about outer race 20a between extension 113 and shoulder 145 of said collar 140.

Thus for each additional roller bearing race assembly to be employed, it is only necessary to add a longer shaft, an inner race containing roller bearings and cage, and a barrel extension collar containing an outer race, and an O-ring seal. Only one other component in our mixing device need be altered. The shank of bolt 119 rearwardly of rear O-ring 126 must correspondingly be lengthened (in relation to the amount of length added through the additional roller bearing race assemblies) so that the threaded end 120 thereof and valve seat 122 will reach sufficiently far rearwardly into chamber 65 and shoulder boss 64.

*Detail on the diisocyanate mix employed in Example I*

The toluene diisocyanate-castor oil pre-polymer employed in Example I is prepared as follows:

|  | Parts by weight |
|---|---|
| Castor oil (AA grade) | 36.4 |
| Polyethylene glycol (molecular weight—600) | 18.2 |
| 2,4-toluene diisocyanate | 45.4 |
|  | 100.0 |

The 2,4-toluene diisocyanate is added to a reaction kettle equipped with a temperature indicator, a water jacket, and means for the introduction of hot and cold water to said jacket. The castor oil and polyethylene glycol are separately mixed together and then added slowly to the 2,4-toluene diisocyanate, the latter having been previously heated to about 30° C. The contents of the kettle are stirred during the addition, while at the same time cold water is pumped through the jacket of the kettle so as to maintain the temperature of the reaction mixture at about 100–110° C. Stirring is continued after completion of the exothermic reaction, which completion is evidenced by a drop in the temperature of the batch, and the batch temperature is maintained at approximately 100° C., through the addition of hot water to the jacket, until samples of the pre-polymer taken from the batch exhibit the desired viscosity of 12,000–20,000 centipoises at 38° C.

EXAMPLE II

Another example of the use of our system of mixing and applying plural component reactants is illustrated by having in tank A a compounded liquid polyalkylene polysulfide polymer, such as liquid "Thiokol LP-2" (made by the Thiokol Corp., of Trenton, New Jersey) mixed with carbon black, phenolic resin and stearic acid, all as more fully shown by a typical commercial composition such as that described fully in an article entitled "Polysulfide Liquid Polymers" by J. S. Jorczak and E. M. Fettes, printed in the Industrial and Engineering Chemistry, vol. 43, page 324, February, 1951. In tank B would be a mixture comprising lead peroxide—7.5 parts, stearic acid—0.75 parts, and dibutyl phthalate—0.75 parts, all by weight. The uniform dispersion of these materials is prepared by milling them together in a ball mill for a period of 24 hours. The positive displacement pumps P and P' are controlled in relation to each other so as to deliver 100 parts by volume from tank A for each 10 parts by volume from tank B (141 parts to 20 parts by weight, respectively) to the mixing zone.

Otherwise the procedure followed in this example is the same as that described in connection with the diisocyanate composition above described. However, in some instances, where atomization or spraying is not desired, and for example where the mixed reactants are desired for use as a calking composition, the orifice 24, or even the opening 22 (by suitable modification) may be connected to an extrusion or calking nozzle.

Our system of mixing and applying plural component reactants is especially suitable in uses where it is desired to apply and cure in place relatively thin resin films, for example, resin films such as are employed in coated abrasive sheets, continuously prepared multi-layer laminates (e.g. plywood), paint applications, etc. Many materials, e.g. epoxide compounds, reactive phenolic compounds, etc., whether monomeric or polymeric, when employed with certain accelerating (cross-linking) agents, react, i.e., set up or commence to set up rapidly, to a firm, hard, tough adherent resistant state. However, many of the most ideal accelerating agents, from the standpoint of rapid cure of the applied resin compositions, cannot be employed with these resins in commercial operations, since the extremely short useful pot life of the resulting resin compositions in bulk quantities (often only a matter of very few minutes or seconds) prevents their use in conventional batch coating techniques. Yet the necessity of intimate and thorough mixing of the resin and accelerator renders the use of prior art continuous mixing techniques unsuitable. Our invention, on the other hand, permits the use of the most rapidly acting accelerating agents known for such curable resinous materials.

The following examples illustrate a few of such applications of the procedures of the present invention.

EXAMPLE III

A highly flexible coated abrasive sheet of a nature such as to be highly suitable for light wood finishing operations is prepared employing the mixing and applying procedures of the present invention. In tank A is placed a liquid epoxy material "Bakelite ERL-2774." In tank B is contained a quantity of liquid diethylenetriamine accelerator. The positive displacement pumps P and P' are controlled in relation to each other so as to deliver 100 parts by volume of the resin from tank A for each 15 parts by volume of the accelerator from tank B (100 parts to 12 parts by weight, respectively).

"Bakelite ERL-2774" is the curable reaction product of bisphenol-A and epichlorohydrin having in the order of 185–200 grams per epoxide equivalent and about 80 grams per hydroxy equivalent and which softens at 10° C. Although this material frequently is referred to as a "resin" it is composed predominately, if not substantially entirely, of monomeric material.

A flexible paper backing sheet or web, which is to serve as the backing sheet for the coated abrasive sheet to be prepared, is continuously led between a pair of driven squeeze rolls for coating on one surface. Mounted above the nip of said squeeze rolls is our novel mixing and applying device having an extrusion nozzle affixed to the discharge end thereof. No atomizing air is employed. The rate of advancement of the backing sheet and the distance between the said squeeze rolls are adjusted in relation to and in conjunction with the rate of discharge from the mixing device (e.g. the device of Figure 1) of the intimately mixed highly fluid resin composition such that a small bead of resin exists continuously between the squeeze rolls over substantially the entire width of the said backing sheet when the coating weight of the making resin applied is 5 grains per 4 inch by 6 inch sheet.

Where desired, a plurality of our mixing devices, spaced transversely of the length of the web of paper, may be feeding resin material continuously to the squeeze rolls.

Grit 320 abrasive grains are then applied to the wet coated surface in accordance with procedures well known to the art, e.g. as described in Carlton U.S. Patent No. 2,318,570, at a coating weight of 14 grains per 4 inch by 6 inch sheet. The abrasive coated sheet may then be festooned and the resin composition cured in an oven at moderate temperatures for a relatively short period of time, e.g. at 180° F. for about 10–12 minutes. To the abrasive coated surface is then applied a sand-size coating of the same epoxy resin-accelerator composition, or preferably an even more rapidly reacting composition (e.g. one where the accelerator is made up of 95% of the amine above mentioned and 5% of thiourea, 10 parts by weight of the accelerator being employed per 100 parts of the aforesaid epoxy resin) in a manner identical to that described in connection with the application of the making coat, the coating weight of the sand-size coat being about 9 grains per 4 by 6 inch sheet. The abrasive sheet, if desired, may then be festooned in an oven. But this is often unnecessary with our procedure, where the resin sand-size coating is sufficiently rapidly reacting. The cured sheet may be rolled up into storage rolls.

Festooning can readily be avoided both in the curing of the grit-bonding or making coat and in the curing of the sand-sizing coat, using rapidly reacting ingredients and our method of mixing and application. Where additional cure is desired beyond that which quickly takes place at room temperatures, the same may be supplied by brief further reaction or curing in the manner described in Davis U.S. Patent No. 2,405,191.

The resin accelerator composition employed as the making and sand-size coatings in the abrasive sheet of the present example has such a short pot life that when the two are mixed in the proportions stated in bulk quantities of about one gallon or more of the epoxy resin, a very small quantity in conventional coating operations, the composition has begun to cure rapidly almost before thorough mixing is achieved. Indeed the reaction at times is dangerously exothermic. Therefore in practical commercial application as practiced heretofore, such a rapidly curing resin composition could not be employed.

The methods and techniques of this invention also have application with resin compositions having a relatively long pot life in bulk, for example, in the order of several hours, but in which the viscosity of a given batch gradually builds up as time passes, due to increasing cure of the resin with passage of time, thus creating problems of coating uniformity from hour to hour. With our continuous mixing and applying procedures, not only is the resultant viscosity of identical mixed resin compositions maintained uniform indefinitely, but also any desired resin temperature may be employed thus having consequent viscosities consistent with optimum coating conditions. Heretofore with such resin compositions, the temperature has had to be kept relatively low in order to lengthen the pot life, thereby necessitating the use of solvents in order to obtain the desired low coating viscosities. Indications are that our invention also has utility in the manufacture by chemical processing of various reaction product materials: for example, the continuous rapid polymerization reaction of isobutylene by mixing monomer, i.e. isobutylene, with a complex of diethylether and boron trifluoride at appropriate proportions and low temperatures; and continuous gelation procedures such as are involved in the manufacture of greases through reaction in the desired (intimately mixed) proportions of a fatty acid material, oil and an alkaline compound.

EXAMPLE IV

The present invention is also highly useful and applicable in the mixing and applying of paint materials, for example epoxy resin based paints which, upon addition thereto of the proper curing agent, set up extremely rapidly. One instance of this sort is in the case of highway painting where rapidly drying or curing paint compositions are desirably employed in order to minimize traffic congestion. In such a case, tank A would, for example, contain a mixture comprising "Epon resin 1001" (the epoxy resin reaction product of epichlorohydrin and bisphenol-A having a melting point of 70° C., manufactured by the Shell Chemical Co.)—60 parts, xylene—30 parts, methylisobutyl ketone—30 parts, "Titanox RA-50" pigment (a co-precipitate of $CaCO_3$ and $TiO_2$)—68 parts, and zinc oxide pigment—17 parts, the ingredients having been previously blended together with a high speed mixer, for example, a "Lightnin" mixer. Tank B should contain a polyamide resin, viz. "Versamid 115" a (70% solution of a liquid amine-dimer acid condensation product in xylene-butanol 4:1). The positive displacement pumps P and P' are controlled in relation to each other so as to deliver 170 parts by volume from tank A for each 40 parts by volume from tank B (205 parts to 32.3 parts by weight, respectively) to the mixing zone.

Otherwise the procedure followed in the present example is identical to that described in Example I. Not only does our novel device thoroughly intermix the stoichiometric portions of the reactants from tank A with those from tank B so as to provide a product having optimum cured properties, but also the pigment materials contained, which are not sufficiently dispersed by the "Lightnin" mixer, are uniformly and thoroughly dispersed throughout the composition even though no individual portion of the reactant materials is retained in the mixing zone of our mixing and applying device more than a short interval of time, e.g. a fraction of a minute or often even a fraction of a second.

Herein we have described generally and specifically our novel mixing and applying procedures and techniques, for mixing and applying ingredients, especially plural component reactants. It will be understood that these examples have been presented in order to describe and illustrate our invention, and not to limit it. All variations and modifications of our disclosure and examples, which come within the appended claims and/or are novel over the prior art, are comprehended.

We claim:

1. A device for intimately and uniformly mixing a plurality of components to be mixed, and for applying the resultant mixture, said device comprising: a frame; a mixing chamber of circular cross section within said frame, the wall of said chamber serving as an outer race; motor means within said frame; a rotary drive shaft extending from said motor into said chamber along the axis thereof, an inner race of circular cross section affixed on said shaft within said chamber for rotating concentrically within the latter, a series of spaced rollers of circular cross section disposed about said inner race and within the confines of said outer race, said rollers rotating about their respective axes and traveling planetarily about said inner race when said inner race rotates; a plurality of entry passages opening at the inner ends thereof at spaced points at one end of said mixing chamber; connecting means on said frame for connecting to the outer end of each of said entry passages a supply line for supplying to said device components to be mixed; valve means interposed in each entry passage actuating means; connecting means between said actuating means and each of said valve means for opening said valve means upon actuation of said actuating means; and a discharge orifice extending from the end of said chamber opposite said one end and terminating in an outlet orifice through which mixed materials are discharged from the device.

2. In combination, a proportioning supply system for separately supplying plural components to be mixed in the desired volume ratio, and a device for intimately and uniformly mixing a plurality of components to be mixed, and for applying the resultant mixture, said device comprising: a frame; a frusto-conically shaped mixing chamber within said frame, the wall of said chamber serving as an outer race; motor means within said frame; a rotary drive shaft extending from said motor into said chamber along the axis thereof, a frusto-conical inner race affixed on said shaft within said chamber for rotating concentrically within the latter, a series of spaced tapered rollers disposed about said inner race and within the confines of said outer race, said rollers rotating about their respective axes and traveling planetarily about said inner race when said inner race rotates; a plurality of entry passages opening at the inner ends thereof at spaced points at one end of said mixing chamber; connecting means on said frame for connecting to the outer end of each of said entry passages a supply line for supplying to said device components to be mixed; flexible supply lines each for carrying components to be mixed connected at one end to said proportioning supply system and at the other end to said connecting means; valve means interposed in each entry passage; actuating means; connecting means between said actuating means and each of said valve means for opening said valve means upon actuation of said actuating means; and a discharge orifice extending from the end of said chamber opposite said one end and terminating in an outlet orifice through which mixed materials are discharged from the device.

3. The device of claim 1 wherein an automatically acting variable orifice back pressure valve is connected to one of said connecting means.

4. The combination of claim 2 wherein an automatically acting variable orifice back pressure valve is interposed between one of said flexible supply lines and one of said connecting means at the point of connection of said means and said supply line.

5. A mixing and applying gun for intimately and uniformly mixing a plurality of components to be mixed, and for applying the resultant mixture, said gun comprising: a forward barrel portion; a rear barrel portion; and a pistol-grip handle affixed to said rear barrel portion; a frusto-conically shaped mixing chamber within said forward barrel portion, the wall of said chamber serving as an outer race; a compressed air motor within said rear barrel portion; a rotary drive shaft extending from said motor into said chamber along the axis thereof, a frusto-conical inner race affixed on said shaft within said chamber for rotating concentrically within the latter, spaced tapered rollers disposed about said inner race and within the confines of said outer race, said rollers rotating about their respective axes and traveling planetarily about said inner race when said inner race rotates; a plurality of entry passages opening at the inner ends thereof at spaced points into the wide end of said mixing chamber; connecting means adjacent said forward barrel portion for connecting to the outer end of each of said entry passages a supply line for supplying to said gun components to be mixed; connecting means on said handle for connecting to said motor a supply line of compressed gas; valve means interposed in each entry passage; a retainer adapter assembly affixed the forward end of said forward barrel portion, said assembly defining a discharge passage extending from the small end of said chamber and terminating in an outlet orifice at the forward end of said assembly; an annular orifice concentric with said annular orifice with connecting means for connecting to the latter a supply line for supplying compressed gas; valve means interposed in said connecting passage; a trigger member movably attached to said rear barrel portion adjacent said handle; connecting means between said trigger member and each of said valve means for opening said valve means upon retraction of said trigger, and means for returning said trigger and therewith said valve means to a closed position upon release of said trigger after retraction thereof.

6. The mixing and applying gun of claim 5 wherein an automatically acting variable orifice back pressure valve is connected to the connecting means of at least one of said entry passages.

7. A device for intimately and uniformly mixing a plurality of components, said device comprising: a frame; a mixing chamber of circular cross section within said frame, the wall of said chamber serving as an outer race; an inner race of circular cross section within said chamber for rotating concentrically within the latter, means for rapidly rotating said inner race, a series of spaced rollers of circular cross section disposed about said inner race and within the confines of said outer race, said rollers rotating about their respective axes and traveling planetarily about said inner race when said inner race rotates; a plurality of entry passages opening at the inner ends thereof at spaced points at one end of said mixing chamber, said passages being respectively associable with supply lines for supplying to said device components to be mixed; actuatable valve means for controlling fluid flow in each of said passages; and a discharge orifice extending from the end of said chamber opposite said one end and terminating in an outlet orifice through which mixed materials are discharged from the device.

8. A device intimately and uniformly mixing a plurality of components, said device comprising: a frame; a frusto-conically shaped mixing chamber within said frame, the wall of said chamber serving as an outer race; a frusto-conical inner race within said chamber for rotating concentrically within the latter, means for rapidly rotating said inner race, a series of spaced tapered rollers disposed about said inner race and within the confines of said outer race, said rollers rotating about their respective axes and traveling planetarily about said inner race when said inner race rotates; a plurality of entry passages opening at the inner ends thereof at spaced points at one end of said mixing chamber, said passages being respectively associable with upply lines for supplying to said device components to be mixed; actuable valve means for controlling fluid flow in each of said passages; and a discharge orifice extending from the end of said chamber opposite said one end and terminating in an outlet orifice through which mixed materials are discharged from the device.

9. In combination, a proportioning supply system for separately supplying plural components to be mixed in the desired volume ratio, and a device for intimately and uniformly mixing a plurality of components to be mixed, said device comprising: a frame; a mixing chamber of circular cross section within said frame, the wall of said chamber serving as an outer race; an inner race of circular cross section within said chamber for rotating concentrically within the latter, means for rapidly rotating said inner race, a series of spaced rollers of circular cross section disposed about said inner race and within the confines of said outer race, said rollers rotating about their respective axes and traveling planetarily about said inner race when said inner race rotates; a plurality of entry passages opening at the inner ends thereof at spaced points at one end of said mixing chamber; flexible supply lines, for carrying components to be mixed, connected at one end to said proportioning supply system and at the other end one each to said passages; actuatable valve means for controlling fluid flow in each of said passages; and a discharge orifice extending from the end of said chamber opposite said one end and terminating in an outlet orifice through which mixed materials are discharged from the device.

10. In combination, a proportioning supply system for separately supplying plural components to be mixed in the desired volume ratio, and a device for intimately and uniformly mixing a plurality of components to be mixed, said device comprising: a frame; a frusto-conically shaped mixing chamber within said frame, the wall of said chamber serving as an outer race; a frusto-conical inner race within said chamber for rotating concentrically within the latter, means for rapidly rotating said inner race, a series of spaced tapered rollers disposed about said inner race and within the confines of said outer race, said rollers rotating about their respective axes and traveling planetarily about said inner race when said inner race rotates; a plurality of entry passages opening at the inner ends thereof at spaced points at one end of said mixing chamber; flexible supply lines, for carrying components to be mixed, connected at one end to said proportioning supply system and at the other end one each to said passages; actuatable valve means for controlling fluid flow in each of said passages; and a discharge orifice extending from the end of said chamber opposite said one end and terminating in an outlet orifice through which mixed materials are discharged from the device.

11. A method of intimately and uniformly mixing a plurality of co-reactant materials including a liquid curable polymeric material and a curing material therefor, said materials co-reacting rapidly when mixed, said method comprising: continuously introducing said materials separately into one end of an annular mixing zone and passing said materials lengthwise thereof; subjecting said materials substantially immediately upon introduction into said zone and while therein to a rapidly whirling and simultaneous turbulent shearing and squeezing action, exerted substantially transversely to the direction of material passage, by means of rollers planetarily traveling and rotating within said zone substantially against the inner and outer walls thereof; and continuously removing the mixed materials from the opposite end of said zone, the dwell time of said materials in said zone being only from a fraction of a second to a fraction of a minute.

12. The method of claim 11 wherein one of said materials comprises a diisocyanate composition and another of said materials comprises an aqueous accelerator composition for said diisocyanate composition.

13. The method of claim 11 wherein one of said materials comprises a polyalkylene polysulfide composition and another of said materials comprises an accelerator for said polyalkylene polysulfide.

14. The method of claim 11 wherein one of said materials comprises an epoxy resin composition and another of said materials comprises an accelerator for said epoxy resin.

15. A method of intimately and uniformly mixing a plurality of materials including a reactive material in fluid form and a material with which said reactive material reacts rapidly when said materials are mixed, said materials not forming the desired product unless mixed rapidly once in mutual contact, said method comprising: continuously introducing said materials separately into one end of an annular mixing zone and passing said materials lengthwise thereof; subjecting said materials substantially immediately upon introduction into said zone and while therein to a rapidly whirling and simultaneous turbulent shearing and squeezing action, exerted substantially transversely to the direction of material passage, by means of rollers planetarily traveling and rotating within said zone substantially against the inner and outer walls thereof; and continuously removing the mixed materials from the opposite end of said zone, the dwell time of said materials in said zone being only from a fraction of a second to a fraction of a minute.

16. A method of intimately and uniformly mixing a plurality of materials in fluid form, said materials co-reacting rapidly when mixed and not forming the desired product unless mixed rapidly once in mutual contact, said method comprising: continuously introducing said materials separately into one end of an annular mixing zone and passing said materials lengthwise thereof; subjecting said materials substantially immediately upon introduction into said zone and while therein to a rapidly whirling and simultaneous turbulent shearing and squeezing action, exerted substantially transversely to the direction of material passage, by means of rollers planetarily traveling and rotating within said zone substantially against the inner end outer walls thereof; and continuously removing the mixed materials from the opposite end of said zone, the dwell time of said materials in said zone being only from a fraction of a second to a fraction of a minute.

17. A method of intimately and uniformly mixing a plurality of co-reactant materials including a liquid curable polymeric material and a curing material therefor, said materials co-reacting rapidly when mixed, said method comprising: continuously introducing said materials separately into one end of an annular mixing zone and passing said materials lengthwise thereof; subjecting said materials substantially immediately upon introduction into said zone and while therein to a rapidly whirling and simultaneous turbulent shearing and squeezing action, exerted substantially transversely to the direction of material passage, by means of rollers planetarily traveling and rotating within said zone substantially against the inner and outer walls thereof; continuously removing the mixed materials from the opposite end of said zone, and applying them in place where desired, the dwell time of said materials in said zone being only from a fraction of a second to a fraction of a minute.

References Cited in the file of this patent

UNITED STATES PATENTS

| | | |
|---|---|---|
| 1,990,555 | Loomis | Feb. 12, 1935 |
| 2,078,983 | Thiberge | May 4, 1937 |
| 2,705,132 | Neville | Mar. 29, 1955 |
| 2,730,433 | Cartledge | Jan. 10, 1956 |
| 2,758,945 | Widmayer | Aug. 14, 1956 |
| 2,788,337 | Preiswerk | Apr. 9, 1957 |
| 2,820,672 | Arce et al. | Jan. 21, 1958 |